United States Patent
Roman et al.

(10) Patent No.: US 8,625,632 B2
(45) Date of Patent: Jan. 7, 2014

(54) MULTIPLE USER MIMO INTERFERENCE SUPPRESSION COMMUNICATIONS SYSTEM AND METHODS

(75) Inventors: Timo Roman, Espoo (FI); Cassio Barboza Ribeiro, Espoo (FI); Tommi Tapani Koivisto, Espoo (FI); Lars Erik Lindh, Helsinki (FI)

(73) Assignee: Nokia Corporation, Espoo (FI)

( * ) Notice: Subject to any disclaimer, the term of this patent is extended or adjusted under 35 U.S.C. 154(b) by 30 days.

(21) Appl. No.: 13/147,352

(22) PCT Filed: Jan. 28, 2010

(86) PCT No.: PCT/IB2010/000157
§ 371 (c)(1),
(2), (4) Date: Jan. 16, 2012

(87) PCT Pub. No.: WO2010/086715
PCT Pub. Date: Aug. 5, 2010

(65) Prior Publication Data
US 2012/0113794 A1 May 10, 2012

Related U.S. Application Data

(60) Provisional application No. 61/148,449, filed on Jan. 30, 2009, provisional application No. 61/155,783, filed on Feb. 26, 2009.

(51) Int. Cl.
*H04J 3/22* (2006.01)

(52) U.S. Cl.
USPC .......................................................... 370/468

(58) Field of Classification Search
None
See application file for complete search history.

(56) References Cited

U.S. PATENT DOCUMENTS

| | | |
|---|---|---|
| 2004/0043783 A1 | 3/2004 | Anderson |
| 2005/0043031 A1* | 2/2005 | Cho et al. ...................... 455/450 |
| 2005/0163070 A1 | 7/2005 | Farnham et al. |
| 2008/0012764 A1* | 1/2008 | Kang et al. .................... 342/367 |
| 2008/0076433 A1 | 3/2008 | Cheng et al. |
| 2008/0212701 A1 | 9/2008 | Pan et al. |
| 2009/0093221 A1 | 4/2009 | Pan et al. |
| 2009/0253421 A1 | 10/2009 | Camp, Jr. et al. |
| 2009/0325625 A1 | 12/2009 | Hugl et al. |
| 2011/0106952 A1 | 5/2011 | Doppler et al. |

FOREIGN PATENT DOCUMENTS

| | | |
|---|---|---|
| CN | 101547066 A | 9/2009 |
| EP | 2141825 A1 | 1/2010 |
| WO | 2008/021062 A1 | 2/2008 |

OTHER PUBLICATIONS

Final Rejection received in corresponding U.S. Appl. No. 12/455,644, Dated Jan. 27, 2012. pp. 1-27.

(Continued)

*Primary Examiner* — Raj Jain
(74) *Attorney, Agent, or Firm* — Harrington & Smith

(57) ABSTRACT

Messages containing interference vectors are transmitted efficiently to user equipments over a downlink channel. A pre-coding indicator channel is used for transmission in an over-the-air packet-based communication system. A table of pre-coding matrix indices or pre-coding vector information is transmitted to user equipments configured in a spatially multiplexed multiple user MIMO configuration. The UEs receive the pre-coding vector information that allows them to determine the pre-coding vectors used to communicate in the downlink direction from a MIMO base station to other MIMO UEs in the cell or system. The UEs use this information to actively suppress inter-user interference.

18 Claims, 8 Drawing Sheets

(56) References Cited

OTHER PUBLICATIONS

"3rd Generation Partnership Project; Technical Specification Group Radio Access Network; Evolved Universal Terrestrial Radio Access (E-UTRA); Physical Channels and Modulation (Release 8)", 3GPP TS 36.211, v8.4.0, Sep. 2008, pp. 1-78.

"3rd Generation Partnership Project; Technical Specification Group Radio Access Network; Evolved Universal Terrestrial Radio Access (E-UTRA); Multiplexing and channel coding (Release 8)", 3GPP TS 36.212, v8.4.0, Sep. 2008, pp. 1-56.

"3rd Generation Partnership Project; Technical Specification Group Radio Access Network; Evolved Universal Terrestrial Radio Access (E-UTRA); Physical layer procedures (Release 8)", 3GPP TS 36.213, v8.4.0, Sep. 2008, pp. 1-60.

"3rd Generation Partnership Project; Technical Specification Group Radio Access Network; Evolved Universal Terrestrial Radio Access (E-UTRA); Physical Channels and Modulation (Release 8)", 3GPP TS 36.211, v8.5.0, Dec. 2008, pp. 1-82.

"3rd Generation Partnership Project; Technical Specification Group Radio Access Network; Evolved Universal Terrestrial Radio Access (E-UTRA); Multiplexing and channel coding (Release 8)", 3GPP TS 36.212, v8.5.0, Dec. 2008, pp. 1-58.

"3rd Generation Partnership Project; Technical Specification Group Radio Access Network; Evolved Universal Terrestrial Radio Access (E-UTRA); Physical layer procedures (Release 8)", 3GPP TS 36.213, v8.5.0, Dec. 2008, pp. 1-74.

International Search Report and Written Opinion received for corresponding Patent Cooperation Treaty Application No. PCT/IB2010/000157, dated May 20, 2010, 17 pages.

Lindh et al., "Multiple User MIMO Communications System and Methods", U.S. Appl. No. 61/148,449, filed Jan. 30, 2009, 39 pages.

\* cited by examiner

MULTIPLE USER MIMO INTERFERENCE SUPPRESSION COMMUNICATIONS SYSTEM AND METHODS

RELATED APPLICATION

This application was originally filed as PCT Application No. PCT/IB2010/000157 on Jun. 28, 2010 and claims priority to U.S. Provisional Application No. 61/148,449 filed Jan. 30, 2009 and U.S. Provisional Application No. 61/155,783 filed Feb. 26, 2009, which are incorporated herein by reference in its entirety.

TECHNICAL FIELD

The present invention is directed, in general, to communication systems and, more particularly, to a system and method for providing inter-user interference suppression in multiple user ("MU") multiple-input multiple-output ("MIMO") configured communications terminals in a packet based communication system.

BACKGROUND

As wireless communication systems such as cellular telephone, satellite, and microwave communication systems become widely deployed and continue to attract a growing number of users, there is a pressing need to accommodate a large and variable number of communication subsystems transmitting a growing volume of data with a fixed resource such as a fixed channel bandwidth accommodating a fixed data packet size. Traditional communication system designs employing a fixed resource (e.g., a fixed data rate for each user) have become challenged to provide high, but flexible, data transmission rates in view of the rapidly growing customer base.

The third generation partnership project long term evolution ("3GPP LTE") is the name generally used to describe an ongoing effort across the industry to improve the universal mobile telecommunications system ("UMTS") for mobile communications. The improvements are being made to cope with continuing new requirements and the growing base of users, and higher data rates and higher system capacity requirements. Goals of this broadly based project include improving communication efficiency, lowering costs, improving services, making use of new spectrum opportunities, and achieving better integration with other open standards and backwards compatibility with some existing infrastructure that is compliant with earlier standards.

The wireless communication systems as described herein are applicable to, for instance, 3GPP LTE compatible wireless communication systems and of interest is an aspect of LTE referred to as "evolved UMTS Terrestrial Radio Access Network," or "E-UTRAN" and also "UTRAN" communications systems. In E-UTRAN systems, the e-Node B may be, or is, connected directly to the access gateway ("aGW," sometimes referred to as the services gateway, or "sGW"). Each Node B may be in radio contact with multiple types of user equipment ("UEs", which generally include mobile transceivers or cellphones, although other devices such as fixed cellular phones, mobile web browsers, laptops, PDAs, MP3 players, and gaming devices with transceivers may also be UEs) via the radio Uu interface.

In the present discussion, particular attention is paid to enhancements presently being considered for Release 9 and Release 10 (sometimes referred to as "LTE Advanced") of the 3GPP standards. These future evolutions of LTE will have additional requirements and demands for increased throughput. Although the discussion uses E-UTRAN as the primary example, the application is not limited to E-UTRAN, LTE or 3GPP systems. In general, E-UTRAN resources are assigned more or less temporarily by the network to one or more UEs by use of allocation tables, or more generally by use of a downlink resource assignment channel or physical downlink control channel ("PDCCH"). The PDCCH is used to allocate resources in other channels, including the physical downlink shared channel ("PDSCH"). LTE is a packet-based system and, therefore, there may not be a dedicated connection reserved for communication between a UE and the network. Users are generally scheduled on a shared channel every transmission time interval ("TTI") by a Node B or an evolved Node B ("e-Node B"). A Node B or an e-Node B controls the communications between user equipment terminals in a cell served by the Node B or e-Node B. In general, one Node B or e-Node B serves each cell. A Node B or e-Node B may be referred to as a "base station." Resources needed for data transfer are assigned either as one time assignments or in a persistent/semi-static way. The LTE, also referred to as 3.9G, generally supports a large number of users per cell with quasi-instantaneous access to radio resources in the active state. It is a design requirement that at least 200 users per cell should be supported in the active state for spectrum allocations up to 5 megahertz ("MHz"), and at least 400 users for a higher spectrum allocation.

In order to facilitate scheduling on the shared channel, the e-Node B transmits a resource allocation to a particular UE in a downlink channel PDCCH to the UE. The allocation information may be related to both uplink and downlink channels. The allocation information may include information about which resource blocks in the frequency domain are allocated to the scheduled user(s), the modulation and coding schemes to use, what the size of the transport block is, and the like.

The lowest layer of communication in the UTRAN or e-UTRAN system, Layer 1, is implemented by the Physical Layer ("PHY") in the UE and in the Node B or e-Node B and the PHY performs the physical transport of the packets between them over the air interface using radio frequency signals. In order to ensure a transmitted packet was received, an automatic retransmit request ("ARQ") and a hybrid automatic retransmit request ("HARQ") approach is provided. Thus, whenever the UE receives packets through one of several downlink channels, including dedicated channels and shared channels, the UE performs a communications error check on the received packets, typically a Cyclic Redundancy Check ("CRC"), and in a later sub-frame following the reception of the packets, transmits a response on the uplink to the e-Node B or base station. The response is either an Acknowledge ("ACK") or a Not Acknowledged ("NACK") message. If the response is a NACK, the e-Node B automatically retransmits the packets in a later sub-frame on the downlink ("DL"). In the same manner, any uplink ("UL") transmission from the UE to the e-Node B is responded to, at a specific sub-frame later in time, by a NACK/ACK message on the DL channel to complete the HARQ. In this manner, the packet communications system remains robust with a low latency time and fast turnaround time.

Many types of UEs may be accommodated by the UTRAN or e-UTRAN. One type of UE service that is presently proposed to be supported in UTRAN and e-UTRAN systems is a UE that includes support for MIMO transmissions. A MIMO UE may have a plurality of antennas and receivers, instead of only one. For example, a MIMO UE may have 2, 4 or more antennas and receivers. Also a transceiving device such as a base station transmits the message for a UE on more than one antenna. By providing multiple pathways for a transmitted message, the likelihood a transmitted message is received without error is increased, and the robustness and coverage of the system is therefore increased.

In single user MIMO ("SU-MIMO") a high rate signal at the transmitter can be split into multiple lower rate signals transmitted simultaneously to a receiver. If the receiver has an array of receive antennas and the signals are sufficiently spatially separated, the receiver can form parallel input streams which can then be combined, thus increasing system throughput while maintaining a lower signaling rate. The applications for the embodiments described herein are directed more specifically to multi-user MIMO ("MU-MIMO"). In MU-MIMO, a transmitter simultaneously transmits different signals over multiple antennas to different receivers also having multiple antennas. Because the signals for a particular UE receiver are spatially multiplexed and spatially separated from the other signals, the receivers can all receive their signals at the same time, thus increasing system throughput.

In implementing a MIMO scheme as proposed in the prior art, the eNB needs to be able to reliably communicate to the UE without undue interference caused by transmissions to other UEs spatially multiplexed on the same radio resources. Present 3GPP standards define MU-MIMO signaling for up to four spatially multiplexed users. In one known approach, each UE is given a separate downlink ("DL") grant. A vector or index indicates the pre-coding to be used for the UE's own transmission. This index is referred to in the specifications as the "pre-coding matrix index" ("PMI"). The index points into a predefined table of pre-coding vectors that, as required by the present standards, is known to both the UEs and the eNBs.

The present approach to MU-MIMO schemes attempts to make the transmission used for spatially multiplexed transceivers completely orthogonal. In the Release 8 standards for 3GPP, pre-coding vectors to be used for MU-MIMO are taken from a predefined codebook. If multi-user orthogonality were in fact accomplished with the codebook, the UEs could operate without inter-user interference. This would require, at least, extremely fine pre-coding granularity and a huge pre-coding vector codebook, which is impractical. In a practical system, the multi-user pre-coding can never be perfect and some inter-user interference will be present.

In the systems of the prior art, no information is signaled to one UE about other UE's pre-coding vectors. Without this information, a UE cannot actively suppress the inter-user interference that is left in the received signals. Because the wireless radio channels and the pre-coding vectors do not match perfectly, there is always some remaining multi-user interference in the signals received at the UE.

It is well known that if the UEs in a single cell or multiple cell multiple user group would know the codebook vectors or pre-coding matrix indices ("PMIs") used by the other UEs, the interference due to inter-user interference can be significantly mitigated. The number of interferers that can be canceled out depends on the spatial degrees of freedom. That is, the number of receivers and antennas available in the UE determines how many spatial interferers can be eliminated in a received signal. For example, assuming that one stream is transmitted to a UE, a UE with two receiver antennas can eliminate one spatial interferer, while a UE with four receiver antennas can eliminate up to three spatial interferers. In order to eliminate the interference, the system must signal the codebook vectors or PMIs of the interfering UEs to the other UEs as well. One known solution to this signaling requirement is to signal them all in the same DL grant from the eNB. This approach has been proposed by several companies participating in developing the 3GPP standards. However, this approach would also require significant increases in signal payload size of the DL grant and this will use up the available resources in the PDCCH. The increase in payload size of the DL grants is particularly significant when multiple UEs are spatially multiplexed together, and/or the code book or PMI is large, that is, if the PMI signaling requires a large number of bits.

A need thus exists for methods and apparatus to efficiently support the MU-MIMO capability for UEs in an over the air interface communications system, with efficient methods to eliminate inter-user interference, without the disadvantages of the known approaches.

SUMMARY

These and other problems are generally solved or circumvented, and technical advantages are generally achieved, by advantageous embodiments of the present invention which include an apparatus and methods according to an embodiment for efficiently transmitting messages containing interference vectors to MU-MIMO UEs over a downlink channel.

In one embodiment, a pre-coding indicator channel is proposed for transmission over a PDSCH in an over the air packet based communications system. A table of pre-coding matrix indices or pre-coding vector information is transmitted to user equipments (UEs) configured in a spatially multiplexed multiple user MIMO configuration. The UEs receive the pre-coding vector information that allows them to determine the pre-coding vectors used to communicate in the downlink direction from a MIMO base station to other MIMO UEs in the cell or system. The UEs may use this information to actively suppress inter-user interference caused by the other spatially multiplexed communications.

In another embodiment, a pre-coding codebook for pre-coding vectors used in an over the air packet based communications system is provided to both a base station and a plurality of UEs that may be configured to operate in a spatially multiplexed multiple user MIMO configuration. A pre-coding indicator channel is defined for transmission of a table containing pre-coding vector information on a shared downlink channel. The UEs can receive this pre-coding information and use the received table to determine which coding vectors in the codebook are in use by other MIMO receivers in the system. The UEs may be configured to actively suppress interference caused by the MIMO communications to other UEs in a spatially multiplexed signal.

In yet another embodiment, a pre-coding indicator channel is provided for transmission of a table of pre-coding matrix information to a plurality of UEs configured to operate as spatially multiplexed multiple user MIMO receivers. Headers are defined to identify the physical resource blocks ("PRBs") and PMIs in use at a given time in the spatially multiplexed MIMO system, and the table is compressed by removing unneeded entries from the table. The table is then periodically transmitted to the UEs. The UEs then may use the received table, and a predefined codebook of pre-coding vectors, to actively suppress inter-user interference in received spatially multiplexed signals transmitted in a downlink direction to the MIMO UEs.

In another embodiment, a software programmable UE is provided with a processor. A computer readable medium is provided with executable instructions disposed on it that, when executed by the processor, perform the steps of receiving a pre-coding indicator table over a shared downlink channel containing pre-coding matrix information for MIMO configured UEs in the system, determining which pre-coding vectors are in use by the MIMO configured UEs by applying the received pre-coding matrix information to a stored pre-coding vector codebook, and removing interference from received, spatially multiplexed signals using active inter-user interference suppression on the received signals.

The foregoing has outlined rather broadly the features and technical advantages of the present invention so that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, reference is now made to the following descriptions taken in conjunction with the accompanying drawing, in which.

DETAILED DESCRIPTION

These and other problems are solved, and advantages are achieved, by embodiments of the present invention.

Figure 1:
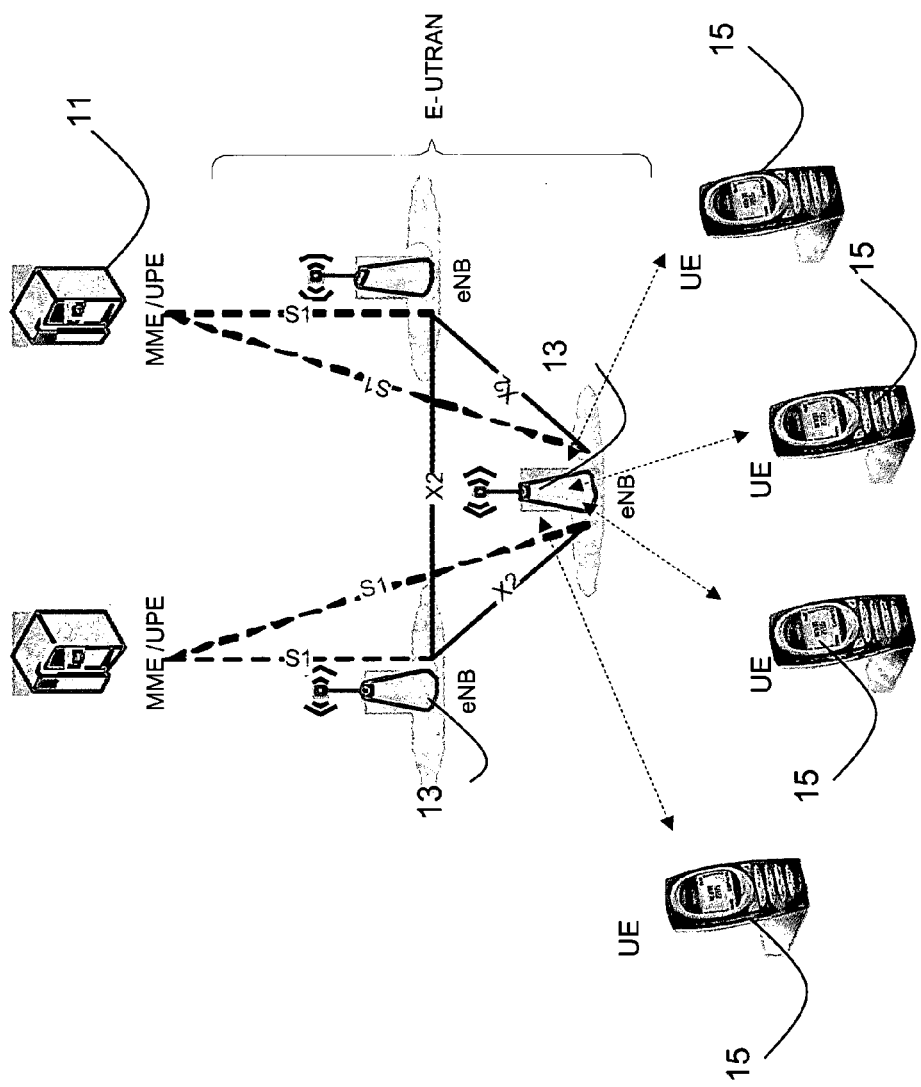
FIG. 1 illustrates user equipment communicating from an e-Node B to a variety of UEs over an air interface, and an e-UTRAN communications system according to an advantageous embodiment of the present invention.

Referring initially to FIG. 1, a system level diagram for a wireless communication system that provides an environment for the application of the principles of the present invention is illustrated. The wireless communication system provides an example e-UTRAN architecture including base stations 13 providing e-UTRAN user plane (packet data convergence protocol/radio link control/media access control/physical transport) and control plane (radio resource control) protocol terminations directed towards user equipment 15. The base stations 13 are again shown interconnected with an X2 interface or communication link. The base stations 13 are also connected by an S1 interface or communication link to an evolved packet core ("EPC") including, for instance, MME/UPE 11 which may form an access gateway ("aGW," a system architecture evolution gateway). The S1 interface supports a multiple entity relationship between the mobility management entities/user plane entities and the base stations and supports a functional split between the mobility management entities and the user plane entities.

The base stations 13 may host functions such as radio resource management (e.g., internet protocol ("IP"), header compression and encryption of user data streams, ciphering of user data streams, radio bearer control, radio admission control, connection mobility control, and dynamic allocation of resources to user equipment in both the uplink and the downlink). Additional functions may include selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobility management entity/user plane entity MME/UPE 11 may host functions such as distribution of paging messages to the base stations, security control, terminating user plane ("U-plane") packets for paging reasons, switching of U-plane for support of the user equipment mobility, idle state mobility control, and system architecture evolution bearer control.

The user equipment 15 receives an allocation of a group of information blocks from the base stations (eNBs). In FIG. 1, a MU-MIMO system is depicted, UEs 15 are provided with multiple antennas as are eNBs 13. As shown, up to four UEs with MIMO capability may be provided in communication with an eNB.

Figure 2:
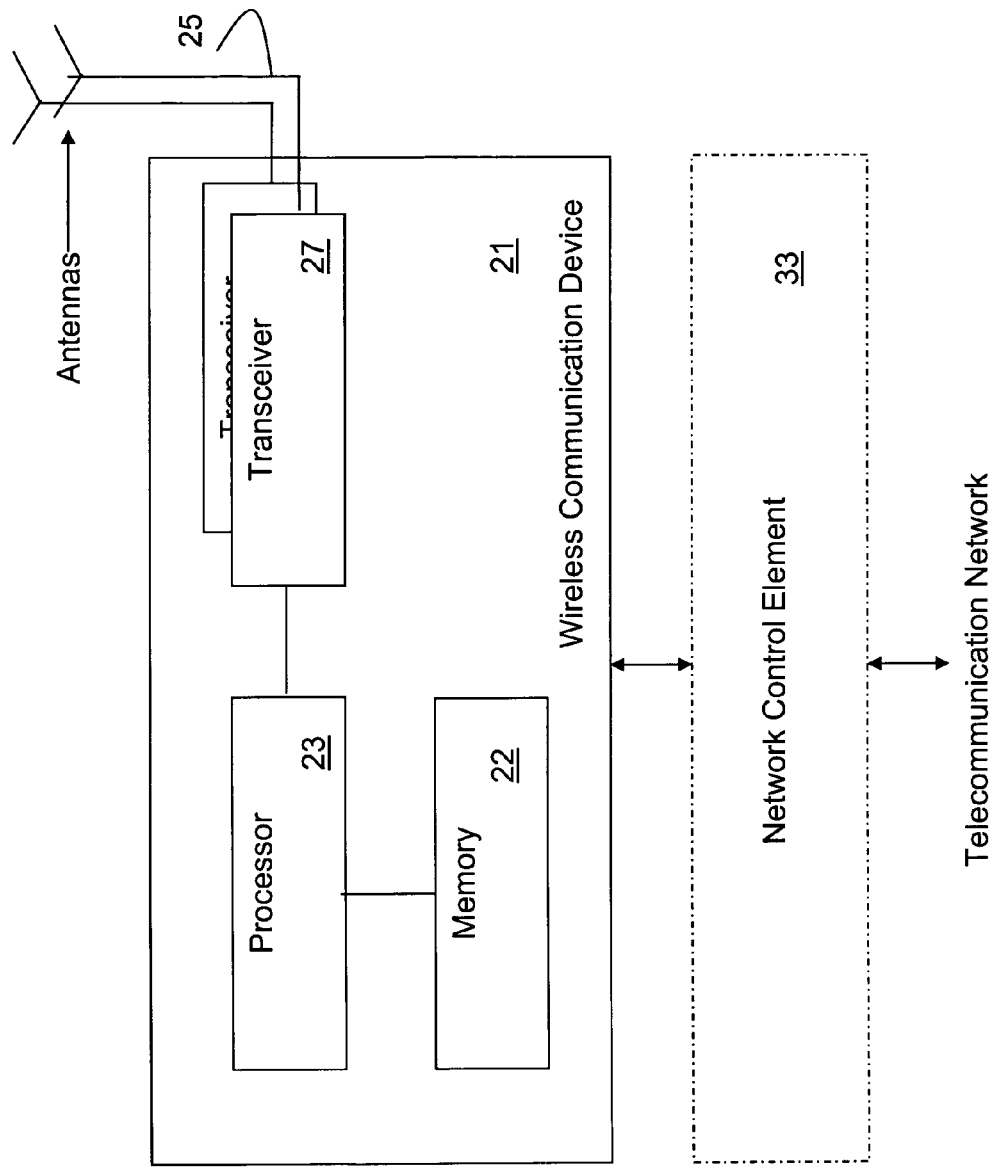
FIG. 2 illustrates a block diagram of a communication element according to an advantageous embodiment of the present invention.

FIG. 2 illustrates a simplified system level diagram of an example communication element of the communication system. FIG. 2 provides an illustration of an environment and structure for application of the principles of the present invention. The communication element may represent, without limitation, an apparatus including a base station, user equipment, such as a terminal or mobile station, a network control element, or the like. The communication element 21 includes, at least, a processor 23, memory 22 that stores programs and data of a temporary or more permanent nature, one or more antennas 25, and a radio frequency transceiver 27 coupled to the antenna and the processor for bidirectional wireless communication. Other functions may also be provided. The communication element 21 may provide point-to-point and/or point-to-multipoint communication services.

The communication element 21, such as a base station in a cellular network, may be coupled to a communication network element 33, such as a network control element of a public switched telecommunication network. The network control element may, in turn, be formed with a processor, memory, and other electronic elements (not shown). The network control element 33 generally provides access to a telecommunication network such as a public switched telecommunication network ("PSTN"). Access may be provided using fiber optic, coaxial, twisted pair, microwave communication, or similar communication links coupled to an appropriate link-terminating element. A communication element 21 formed as a mobile station is generally a self-contained device intended to be carried by an end user and connects wirelessly to an eNB, thus in that case, it is not directly connected to element 33.

The processor 23 in the communication element 21, which may be implemented with one or a plurality of processing devices, performs functions associated with its operation including, without limitation, encoding and decoding of individual bits forming a communication message, formatting of information, and overall control of the communication element, including processes related to management of resources. Exemplary functions related to management of resources include, without limitation, hardware installation, traffic management, performance data analysis, tracking of end users and mobile stations, configuration management, end user administration, management of the mobile station, management of tariffs, subscriptions, and billing, and the like. The execution of all or portions of particular functions or processes related to management of resources may be performed in equipment separate from and/or coupled to the communication element, with the results of such functions or processes communicated for execution to the communication element. The processor of the communication element 21 may be of any type suitable to the local application environment, and may include one or more of general-purpose computers, special-purpose computers, microprocessors, digital signal processors ("DSPs"), and processors based on a multi-core processor architecture, as non-limiting examples.

The transceivers 27 of the communication element 21 modulate information onto a carrier waveform for transmission by the communication element via the antennas 25 to another communication element. The transceiver demodulates information received via the antennas for further processing by other communication elements. In FIG. 2, the device 21 has multiple antennas 25 and corresponding transceivers 27.

The memory 22 of the communication element 21, as introduced above, may be of any type suitable to the local application environment, and may be implemented using any suitable volatile or non-volatile data storage technology, such as a semiconductor-based memory device, a magnetic memory device and system, an optical memory device and system, fixed memory, and removable memory. The programs stored in the memory may include program instructions that, when executed by an associated processor, enable the communication element to perform tasks as described herein. Exemplary embodiments of the system, subsystems, and modules as described herein may be implemented, at least in part, by computer software executable by processors of, for instance, the mobile station and the base station, or by hardware, or by combinations thereof. Other programming may be used such as firmware and/or state machines. As will become more apparent, systems, subsystems and modules may be embodied in the communication element as illustrated and described above. Further, the communication element 21 may store in memory 22 various information that persists, including configuration information, for use in communicating over the air interface.

FIG. 2 depicts a communication element 21 that has multiple antennas 25. Current specifications for the 3G standard contemplate eNBs with 1, 2 or 4 antennas, likewise UEs may have 1, 2 or 4 antennas, and these multiple antenna arrangements may be extended to more than 4 in future standards. For a MU-MIMO UE, at least 2 antennas and associated transceiver circuitry may be provided.

Figure 3:
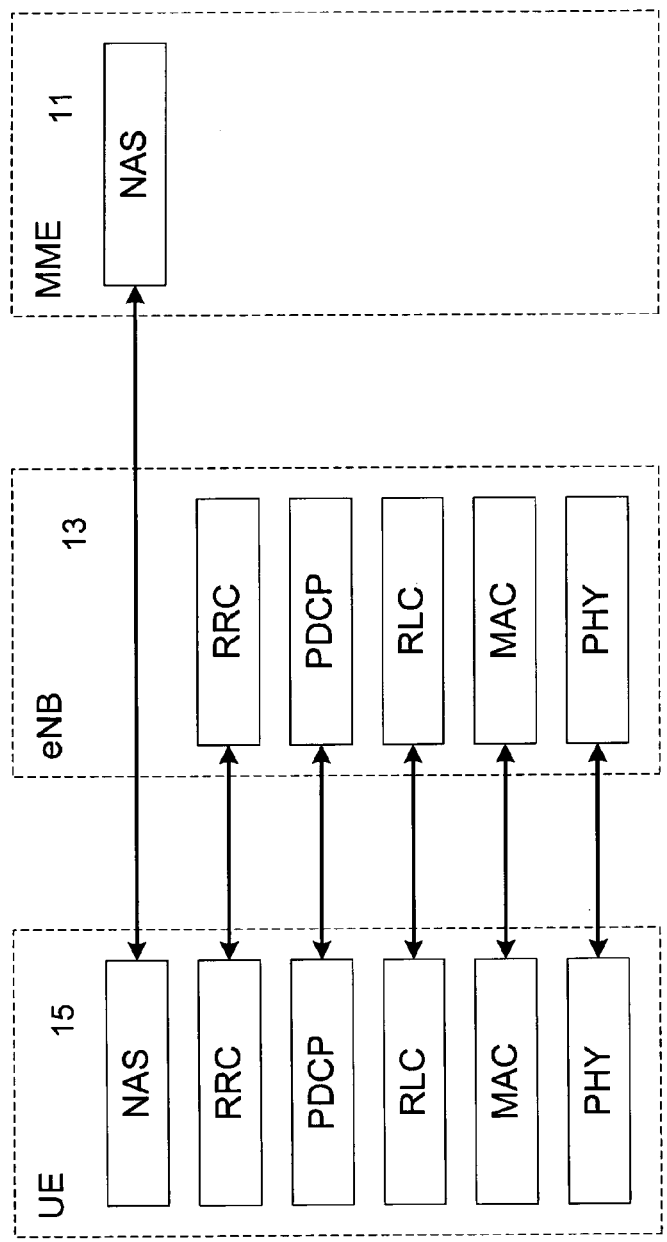
FIG. 3 illustrates communication layers of a UE, eNB and MME according to an advantageous embodiment of the present invention.

FIG. 3 depicts a block diagram of an embodiment of user equipment 15 and a base station 13 constructed according to the principles of the present invention. The user equipment UE 15 and the base station eNB 13 each include a variety of layers and subsystems: the physical layer ("PHY") subsystem, a medium access control layer ("MAC") subsystem, a radio link control layer ("RLC") subsystem, a packet data convergence protocol layer ("PDCP") subsystem, and a radio resource control layer ("RRC") subsystem. Additionally, the user equipment and the mobile management entity 11 include a non-access stratum ("NAS") subsystem.

The physical layer subsystem supports the physical transport of packets over the air interface and provides, as non-limiting examples, cyclic redundancy check ("CRC") insertion (e.g., a 24 bit CRC is a baseline for PDSCH, channel coding, PDCCH coding, physical layer hybrid-automatic repeat or retransmit request ("HARQ") processing, and channel interleaving. The physical layer subsystem also performs scrambling such as transport-channel specific scrambling on a downlink-shared channel ("DL-SCH"), broadcast channel ("BCH") and paging channel ("PCH"), as well as common multicast channel ("MCH") scrambling for all cells involved in a specific multimedia broadcast multicast service single frequency network ("MBSFN") transmission. The physical layer subsystem also performs signal modulation such as quadrature phase shift keying ("QPSK"), 16 quadrature amplitude modulation ("QAM") and 64 QAM, layer mapping and pre-coding, and mapping to assigned resources and antenna ports. The media access layer or MAC performs the HARQ functionality and other important functions between the logical transport layer, or Layer 2, and the physical transport layer, or Layer 1.

Each layer is implemented in the system and may be implemented in a variety of ways. A layer such as the PHY in the UE 15 may be implemented using hardware, software, programmable hardware, firmware, or a combination of these as is known in the art. Programmable devices such as DSPs, reduced instruction set ("RISC"), complete instruction set ("CISC"), microprocessors, microcontrollers, and the like may be used to perform the functions of a layer. Reusable design cores or macros as are provided by vendors as ASIC library functions, for example, may be created to provide some or all of the functions and these may be qualified with various semiconductor foundry providers to make design of new UEs, or e-Node B implementations, faster and easier to perform in the design and commercial production of new devices.

Figure 4:
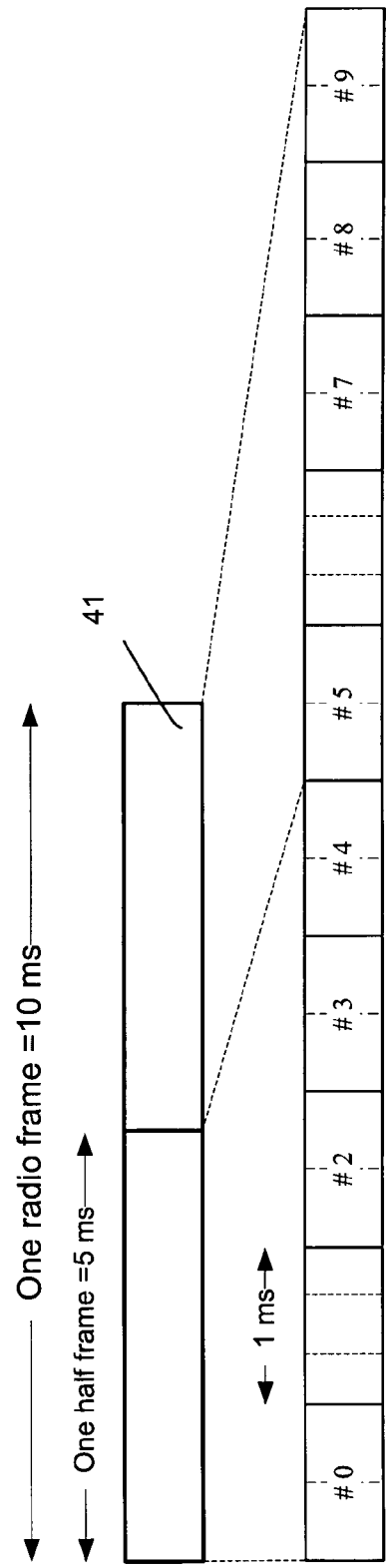
FIG. 4 illustrates a radio frame as used in systems where embodiments of the present invention are applicable.

FIG. 4 depicts the basic arrangement of an exemplary radio frame for LTE TDD communications. The radio frame 41 is 10 milliseconds long. Each frame is divided into two half-frames of 5 milliseconds, and each half-frame has 5 sub-frames of 1 milliseconds duration. The proportion of uplink ("UL") and downlink ("DL") sub-frames in a radio frame is dependent on the configuration selected, and may be varied. Another frame structure is provided for FDD communications which are also supported.

For additional information about the physical layer implementation and configurations for 3GPP, Release 8, reference is made to the Technical Specification numbered 3GPP TS 36.211, version 8.5.0, dated December 2008, entitled "Physical Channels and Modulation" (hereinafter, "TS 36.211"); the Technical Specification numbered 3GPP TS 36.212, version 8.5.0, December 2008, entitled "Multiplexing and Channel Coding" (hereinafter "TS 36.212"); and the Technical Specification numbered 3GPP TS 36.213, version 8.5.0, dated December 2008, entitled "Physical Layer Procedures" (hereinafter "TS 36.213"). Each of these documents is available from the 3GPP website at the url www.3gpp.org.

Presently, the standards for 3GPP systems contemplate that UEs will periodically receive some configuration information that is persistent for a period of time or until a network or channel condition changes. These are "semi-static" configurations. One of the configurations used for those UEs that support it is MU-MEMO in the downlink direction (from an eNB to UE). MU-MIMO allows the multiplexing of several UEs onto the same physical resources (e.g., physical resource blocks or PRBs in the frequency domain). For this configuration to operate reliably, a pre-requisite is that the UEs are well separated in the spatial domain. This means that their corresponding wireless channels do not belong to the same spatial or vector subspace. In actual practice, the requirement means that the channels are to be orthogonal, or quasi-orthogonal. The purpose of using the MU-MIMO configuration is to achieve increased spectral efficiency, and hence, increased cell throughput. Some latency gains may be possible as well. If MU-MIMO is used, then users should not have to wait to get a scheduled resource (since the resources are spatially multiplexed, the communications can happen at the same time).

In the LTE standards, two and four stream MU-MIMO has already been defined for the downlink communications. The concept envisioned to get the full potential of this capability is to multiplex several single-stream transmissions, one for each UE. In particular, TS 36.213, section 7.1 and section 7.1.5 describe MU-MIMO aspects. TS 36.212, section 5.3.3.1.4A describes the DCI format 1D that is used for downlink grants in LTE MU-MIMO.

The discussion of embodiments of the invention is presented herein in terms of illustrative, non-limiting examples. Some of these illustrative examples are based on the present configurations contemplated in the 3GPP specifications. However, the number of bits, number of vectors, number of MU-MIMO UEs that may be active, and number of antennas that a UE may have, size of the pre-coding vector codebook, and type of PMI channel, are all variables that may be extended and these variations are also within the scope of the embodiments and contemplated as additional embodiments of the invention that fall within the scope of any appended claims. That is, the total number of bits per PMI for a given antenna configuration stated throughout the document are only for exemplary purposes, and these numbers can be arbitrary, provided this is predetermined information (together with the corresponding pre-coding vector codebook) known to both the UE and the eNB. The present invention is not limited in application to systems conforming to the 3GPP specification or to the eNBs and UEs now contemplated or described.

According to the current technical specifications of the 3GPP standard, each UE in the cell space or being served by an eNB is given a vector or index to the pre-coding codebook that is to be used. The codebook is used for spatial pre-coding at the eNB for transmissions on the downlink intended to be received by a particular UE. The latter UE in turn then uses this information to demodulate and decode the received data intended for it. This information is provided in the downlink control channel using the DCI format designated as "1D" in TS36.212, at section 5.3.3. This index is referred to as the pre-coding matrix index (PMI). Wideband pre-coding has been chosen for LTE Release 8. For each UE, this means there is a single PMI that spans the resources allocated to that UE (in frequency). The use of frequency selective pre-coding is not precluded for use in future standards, that is, each UE may receive several PMIs and make use of frequency sub-bands, or chunks. As currently specified, pre-coding with 2 (or alternatively, 4) transmit antennas at the eNB is performed with a total of 4 (or respectively 16) vectors. The wideband PMI indication field in the DCI format 1D comprises 2 bits (or respectively 4 bits) when the eNB is equipped with 2 (or respectively 4) transmit antennas. These concepts may be extended to additional antennas in the future. The PMI channel and the compression methods described for the embodiments herein may be extended and used for different numbers of antennas and different codebook vectors. The LTE numbers are presented here as examples to illustrate and explain the invention, and these illustrations are not limiting. Note that the UE is to report, via an uplink channel message, which PMI suits it best, given the channel conditions. This is done before the pre-coding can be effectively applied at the eNB.

As implemented in the present standards, it is expected that the use of MU-MIMO will not provide much actual gain in spectral efficiency. At least three reasons for this have been identified:
1) Small codebook sizes. Small codebook sizes lead inherently to larger quantization errors. This means that the reported pre-coding vector does not match precisely the true wireless channel, and consequently larger inter-user interference may occur.
2) A small codebook is used for channel indication and quantization of final pre-coding vectors. This small codebook limits the performance of pre-coding when the channels are not orthogonal.
3) As presently provided in the technical specifications, each MU-MIMO UE receives its own PMI in the downlink grant transmitted over the PDCCH. However, in the present systems, the UE is not aware of the interfering users' PMIs that may fall across its allocated resources. The practical impact is that the UE cannot perform active cancellation of inter-user interference; even if technically such processing is feasible in the UE.

The efficiency gains of MU-MIMO could be enhanced. It is known to those skilled in the art, and has been verified in system simulations, that a UE that has several receive antennas and the pre-coding information for the other users can cancel out the interference. This will lead to a significant increase in UE performance. The number of spatial interferers that can be cancelled is a function of the number of receive antennas, which provide the spatial degrees of freedom. A UE with two receive antennas may cancel out a single interferer. A UE with four receive antennas may cancel out three spatial interferer users. Of course, these concepts may be extended to UEs with eight or more antennas.

Thus, if a UE were aware of the PMIs of other spatially multiplexed UEs and has enough spatial freedom (additional antennas), then, the inter-user interference at the UE can be greatly mitigated by the use of active cancellation. There have been proposals to add the PMI information of all of the MU-MIMO UEs to each DCI 1D format in addition to the addressed UEs own PMI information. The problem with this approach is that the use of the system resources in such a case is very inefficient. Each DCI transmission for a UE contains the same PMI information than the DCI transmissions for the UEs it is spatially multiplexed with, which is clearly inefficient. The control channel payload size increases dramatically if this approach is used. The PDCCH resources are used up with redundant information and thus, this approach has not been adopted. Thus far, existing solutions assume that spatially multiplexed UEs have an identical frequency domain allocation and wideband pre-coding is used to separate the transmissions.

Of course, if the pre-coding were in fact perfect, there would not be any inter-user interference to contend with. However, in a practical system with non-ideal pre-coding vectors, there is residual interference in the received data streams. This arises mainly due to at least three factors:
1) Quantization of pre-coding vectors at the UE for feedback to eNB;
2) Quantization of the computed pre-coding vectors at eNB; and
3) Limited granularity of pre-coding vectors in frequency domain.

Due to these factors, interference from streams transmitted to different users is known to be non-negligible at the MU-MIMO UEs. As one known approach, increasing the codebook sizes would reduce the influence of quantization errors. However, this approach limits even further the practical frequency granularity of pre-coding vectors, since larger codebooks imply higher signaling overhead for the pre-coding vectors index indications. In the present LTE/3GPP standard (Release 8), it is therefore assumed that MU-MIMO capability is applied only to systems where spatial correlation at the transmitter (eNB) is assumed to be very high. This requirement alleviates the errors that would otherwise be introduced due to the limited granularity of the pre-coding vectors in frequency domain, but this requirement also greatly limits the applicability of MU-MIMO. Thus, this approach limits the possible gains in spectral efficiency. Simulations show that interference from other spatially multiplexed streams is still present even in this limited scenario, and hence this present approach is not enough to approach the high spectral efficiency that is known to be possible with MU-MIMO.

Another known approach that could be used to mitigate interference from other streams in downlink MU-MIMO is to allow the receivers (UEs or, eNBs) to actively suppress interference from other streams. This can be achieved, e.g., with a linear minimum mean squared error ("LMMSE") receiver. The basic requirement for implementation of such a receiver is that each UE must be aware of the pre-coding vectors applied to the other UEs. Despite the large potential performance gains, this option has not been considered in the present specifications of LTE or 3GPP due to the large signaling overhead that is implied. If an LMMSE receiver could be assumed at the UEs, it is then possible to extend application of MU-MIMO transmission to many applications, even for systems having moderate and low spatial correlation levels at the transmitter side, given that the frequency granularity of PMI indication is correspondingly increased to take into account the larger channel variations.

Embodiments of the present invention provide UE downlink signaling protocols and methods for providing the additional PMI information to the UEs, while maintaining efficient use of the downlink channel resources. By combining these embodiments of the signaling protocols of the invention with UE hardware that can actively mitigate inter-user interference at the receiver, the use of MU-MIMO capability can be greatly extended and system efficiency increased over the systems of the prior art.

A related, commonly-owned, co-pending application, U.S. Provisional Patent Application No. 61/148,449, filed Jan. 30, 2009, entitled "Multiple User MIMO Communications System and Methods", which is hereby incorporated by reference herein in its entirety, provides embodiments for communicating the PMI information for use by MU-MIMO UEs on a physical downlink control channel (PDCCH). The general concept of the embodiments of the related application is that the interference vectors, or alternatively their indices (referred to as "PMIs" in the standards), are stored sequentially in a DCI format payload or a similar payload that is transmitted on the PDCCH. The receiving UE is given an index into the payload when that UE is configured in MU-MIMO configuration in either single cell MU-MIMO or multiple cell MU-MIMO. This information is provided to the UE by radio resource control ("RRC") signaling.

Embodiments of the present invention provide alternative methods and systems for providing a UE configured as a MU-MIMO downlink receiver of the PMI information for the other MU-MIMO receivers in the cell, so that the UEs can then actively mitigate the inter-user interference in the received MIMO signals. Further, embodiments of the invention may be advantageously extended to apply to the general framework of collaborative MIMO (C-MIMO) transmissions presently being considered. Also, embodiments of the present invention could be applied to device to device ("D2D") communications where inter-user interference may also occur for spatially multiplexed communications.

Embodiments of the present invention are intended to be applied in communications systems, including but not limited to LTE systems. In general, embodiments of the present invention provide a new proposal for a physical downlink channel for transmitting PMI information. Other information could also be transmitted over this channel, but it is intended as a new channel for transmitting pre-coding vector or pre-coding matrix information to UEs. These UEs are configured to actively suppress inter-user interference while in MU-MIMO mode. It is known that UEs with knowledge of the PMIs of other UEs can use this information to actively suppress interference, for example using LMMSE receivers. Further, UEs having multiple receive antennas can eliminate interferers from received signals intended for the UE.

In an exemplary embodiment, the new physical download channel is provided which is hereinafter referred to as the "pre-coding indicator channel". The pre-coding indicator channel is used to transmit pre-coding information about the spatial pre-coding applied by the transmitter (base station or eNB) when transmitting downlink signals over a set of PRBs. The pre-coding information is targeted to a group of UEs or a sub-group of UEs.

In another exemplary embodiment, the pre-coding information is provided as pre-defined PMIs that are known to the base station and the user equipments. The PMIs are each unequivocally linked to entries in a pre-coding codebook that is also known to the UEs. The codebook contains, for example, pre-coding vectors or weights to be applied upon transmission by the base station.

In another exemplary embodiment, the pre-coding indicator channel may be transmitted over a PDSCH such as presently defined by the Release 8 standards of the LTE, and which will be further defined in future releases of the LTE standards for packet based radio communications systems.

In another exemplary embodiment, the pre-coding indicator channel may be scheduled in a downlink allocation grant communicated over the PDCCH of LTE Release 8.0 standards and which will be also be further defined in future releases of the LTE standards. In another embodiment, downlink control information ("DCI") format can be defined for the purpose of scheduling the pre-coding indicator channel. The new DCI format can be defined to be the same size as a known DCI format, such as format '1A' of the Release 8 standard of the LTE, in order to minimize blind decoding that would otherwise occur. The new downlink grant to schedule the pre-coding information channel may include information required for the UE to decode the pre-coding information channel, for example, the resource allocations, modulation and control schemes ("MCS"), and any other relevant information needed to receive the pre-coding indicator channel over the PDSCH.

In another exemplary embodiment, the PDCCH downlink grant contains a UE identifier. The identifier may be provided as a separate group identifier, or cyclic redundancy checking ("CRC") information may be combined with a UE group radio network temporary identifier ("RNTI"). In operation, UEs configured in MU-MIMO mode are already expected to be in good channel conditions (high signal-to-interference-and-noise ratio or "SINR") and so, a relatively low channel coding rate (referred to as the "aggregation factor") is expected to be needed, the low aggregation factor further spares the resources on the PDCCH.

The pre-coding indicator channel may also incorporate CRC. This error detection scheme is important to ensure the PMI information extracted by the receiving UE is correct. If incorrect PMI information is used by a UE to remove inter-user interference, then system performance will be negatively impacted.

Figure 5:
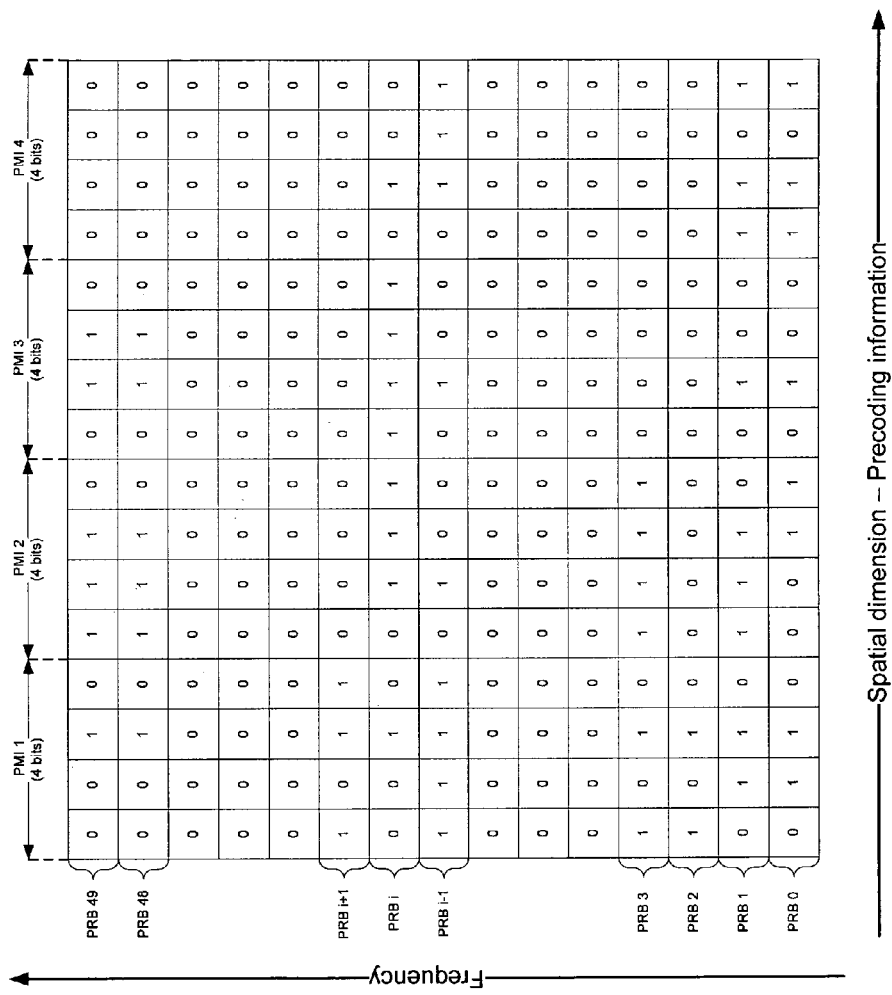
FIG. 5 illustrates an embodiment of a pre-coding information table of the invention.

To implement the pre-coding indicator channel, a method for transmitting the PMI information to the UEs over the PDSCH is needed. In one exemplary method embodiment, a table, or bitmap, is transmitted wherein each row (or, respectively, column) corresponds to a physical resource block (PRB in the frequency domain) and each column (or, respectively, row) contains pre-coding information, for example, PMI indices one provided after another for each of the spatially multiplexed UEs using the specific frequency resource. A specific PMI code (e.g., all zeroes) can be used to indicate no PMI for that UE on that resource. FIG. 5 depicts a table illustrating this embodiment. Alternatively, as another method embodiment, the PMIs on a given resource may be set to be identical, as a convention to indicate that there is only a single UE (or even no UE) scheduled on these specific resources, and to indicate that the UE uses the repeated PMI value. This approach builds on the fact that it typically does not make sense, from a system view, to spatially multiplex several UEs with the same PMI, as if this were done their precoded signals would completely overlap and thus cannot be separated at the UE side. Assuming then that this is not done, some efficiency in the PMI code can be achieved using all zeroes or identical PMI indications.

In FIG. 5, the vertical axis of the table is arranged in order of the 50 available (0-49) frequency multiplexed PRBs. The horizontal axis depicts the four available UE PMI fields for each PRB, and there are four bits for each PMI. This table thus contains all of the PMI information a UE needs in order to determine what sources of inter-user interference are in the MIMO spatially multiplexed communications being transmitted at a particular time, on a particular PRB. (Note the PMI information includes the UE's own PMI, which is redundant in the sense that it is also signaled elsewhere, and some attempt to remove the redundancy may also, as alternative embodiments described in more detail below, be used to reduce the signaling overhead.)

In additional embodiments, various approaches to further reduce the amount of pre-coding vector information required to be communicated to the UEs are applied. These embodiments may still further improve the use of resources on the PDSCH. For example, various compression methods may be used on the table or bitmap of FIG. 5. Some of these embodiments may be combined together for even better compression. The embodiments may also be used singly to provide compression of the table.

In one embodiment for compression of the table of FIG. 5, advantage is taken of the fact that a target group of UEs may not use the whole system resources at a given time instance. A bitmap header labeled 'Header 1' in FIG. 6 may be defined. This header may be transmitted indicating the PRB resources currently in use by the target UE group. Then the pre-coding information is only provided for these allocated resources.

Figure 6:
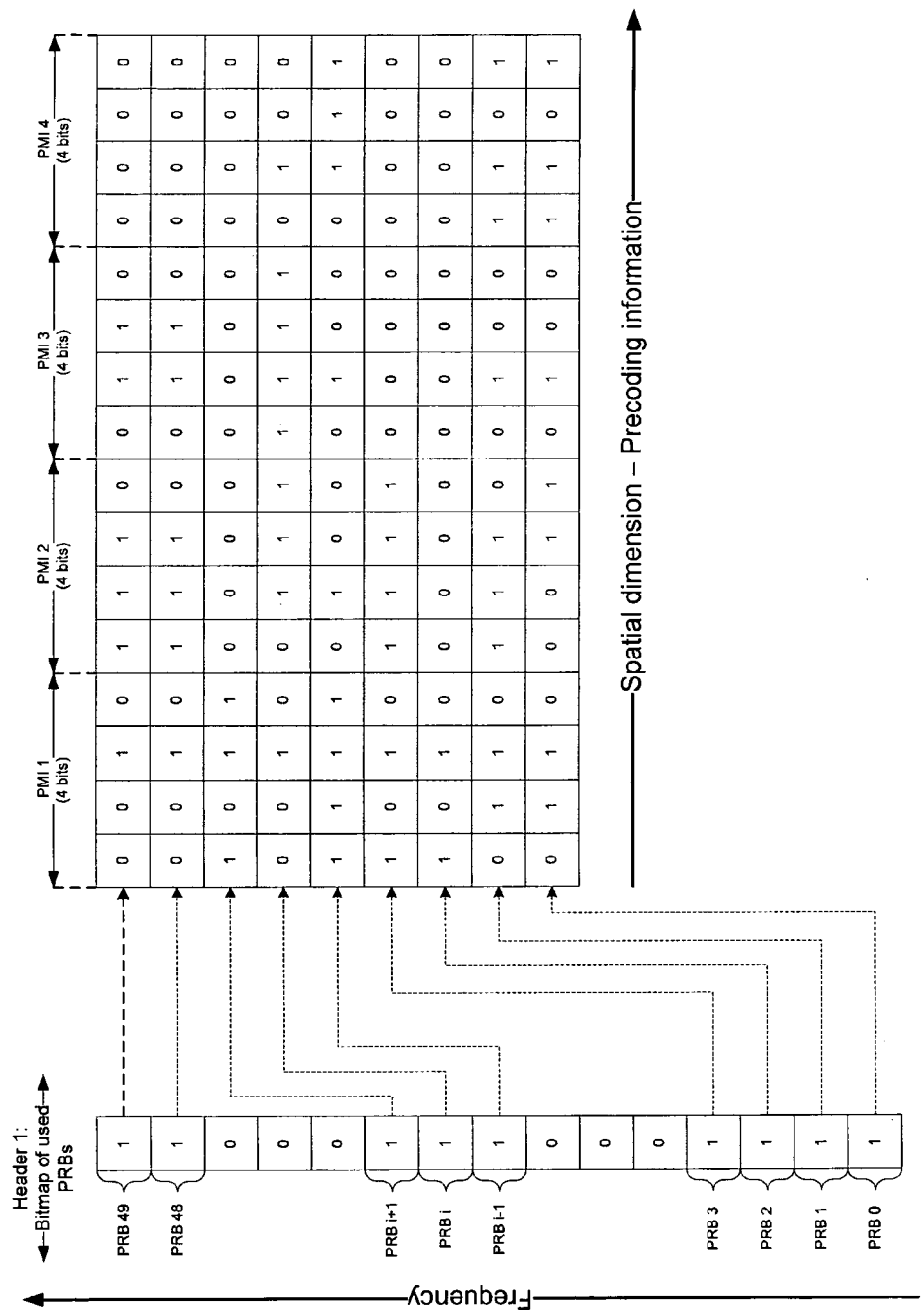
FIG. 6 illustrates another exemplary embodiment of a pre-coding information table of the invention.

In FIG. 6, the header indicates for each of the 50 available PRBs 0-49, which are in use. Then the PMI table is compressed to provide the four UE PMI information for only those active PRBs for the target group of UEs. Thus, the number of rows in the table is substantially reduced, reducing the signaling overhead.

Figure 7:
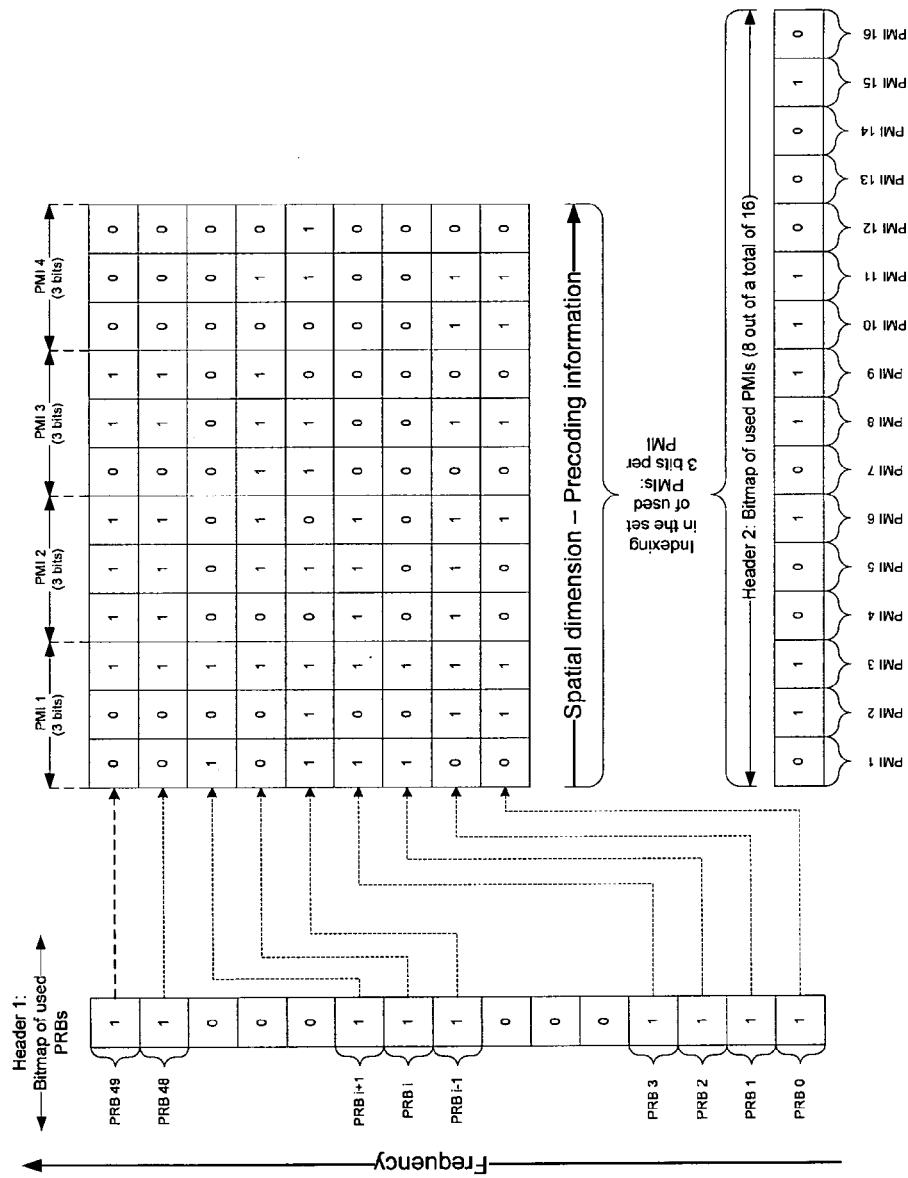
FIG. 7 illustrates another exemplary embodiment of a pre-coding information table of the invention.

In an alternative method embodiment for compression of the pre-coding table information, advantage is taken of the fact that not all available PMIs are expected to be in use at a given time instant. This is particularly true for a small number of UEs in the target group. FIG. 7 depicts an embodiment where this method is combined with the compression method illustrated in FIG. 6. In FIG. 7, the pre-coding for the target group may only use a subset of the available PMIs. Another header, labeled 'Header 2' in FIG. 7, may be provided, and it is used to indicate which of the available PMIs are in use. In FIG. 7, the application of this method embodiment is depicted in combination with the two approaches taken above. In this example, only eight of the possible sixteen PMIs are in use, which reduces the number of information bits needed to indicate the PMI for each UE to three, instead of four, saving bits for each row of the table to be transmitted.

Figure 8:
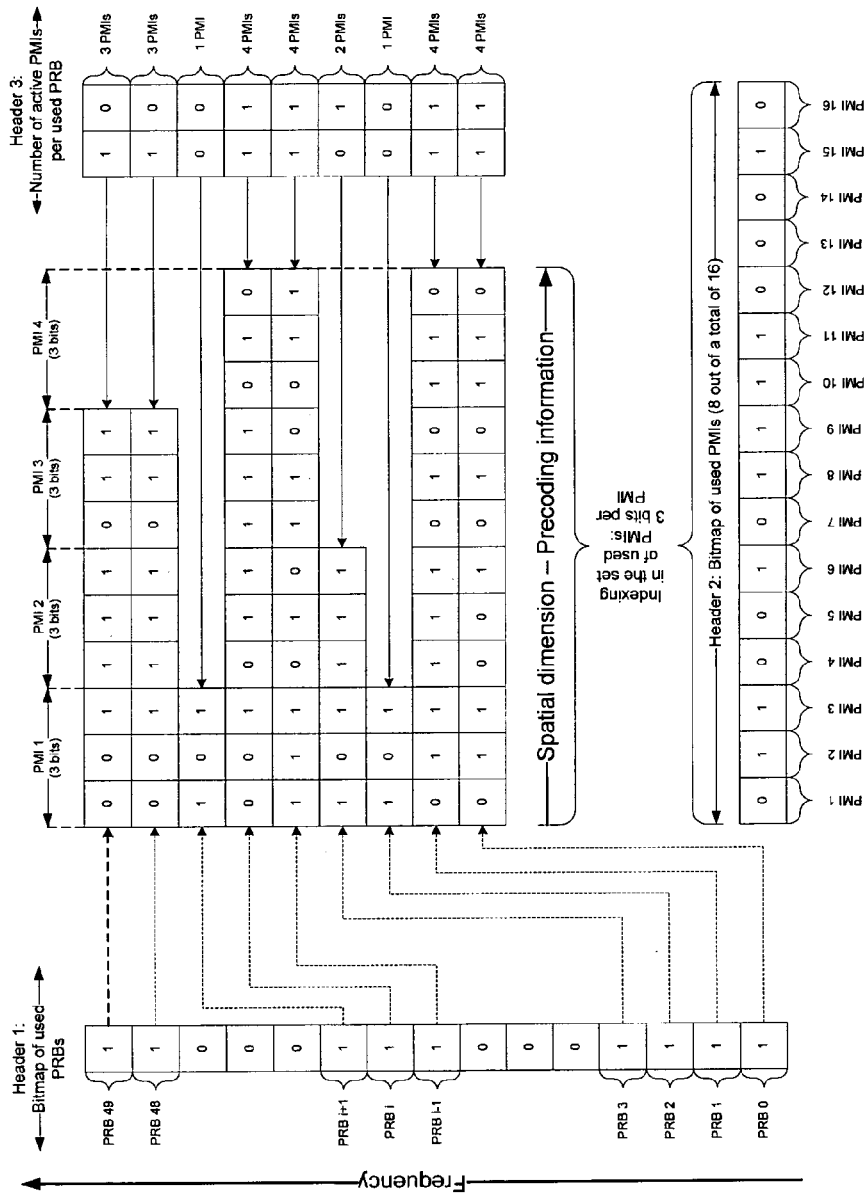
FIG. 8 illustrates yet another exemplary embodiment of a pre-coding information table of the invention.

In another embodiment for compression, advantage is taken of the fact that the number of spatially multiplexed UEs per resource may vary. One or two bits may be defined that may be used to indicate how may PMIs need to be signaled for each PRB. FIG. 8 depicts the application of this approach on the pre-coding information table. Another header, labeled Header 3, is formed along with the previous Header 1 (PRBs in use) and Header 2 (PMIs in use) to indicate the number of active PMIs in the active PRBs. Then the table is reduced by removing unneeded PMI information, Header 3 contains, for each active PRB, the two bit field indicating the number of active PMIs, 1, 2, 3, or 4, and thus the table of FIG. 5 is compressed by removing the unneeded PMI entries.

Advantageous results may be obtained by applying only one, two, or all three of the methods described so far for compression of the table to be transmitted. Each may be operated as an independent approach, or advantageously combined with the others.

In another exemplary method embodiment for compressing the pre-coding information, coding of paired UEs is considered. For the pre-coding information to be useful, the PMIs for UEs sharing the same resource in a spatially multiplexed communications channel should be different. Thus, by considering these aspects, the pre-coding information may be arranged to jointly code all the PMIs in use at a given time on a specific resource (e.g., PRB).

In yet another method for compression of the pre-coding information, additional compression is achieved by tying the signaling format of the PMIs to the PMI reporting format. Presently, TS 36.213, in table 7.2.1-5, provides frequency selective PMI reporting defined by M PRBs, where M is a bandwidth dependent value that varies from 1-4. The pre-coding information could be broadcast as PMIs per sub-band and not per PRB. This approach may require some added overhead because resource allocation among UEs does not necessarily match the sub-bands, and a finer (per PRB) signaling may be required. However, the use of sub-band compression allows for a significant decrease in PMI information signaling, and possible losses in demodulation performance may be small or even null in a practice, for example when PRB allocation among spatially multiplexed UEs is aligned. To further explain this concept, PMI information may be reported by UEs on a per sub-band basis (e.g., per groups of $M>=1$ PRBs), and then precoding would be applied by the eNB to each UE per sub-band, as well. Using this approach would mean, in practice, that PMIs would be repeated M times over the PMI indicator channel as it was described in the embodiments presented so far, because PMIs were indicated per PRB. In an alternative approach, one could save significant signaling overhead in case the PMI indicator channel indicates the applied PMIs per sub-band only (i.e., per group of $M>1$ PRBs). The only small issue might be that resource allocations between the UEs do not necessarily match the sub-band definitions, but if the system neglects that fact, significant overhead savings may be achieved using this alternative approach with potentially low performance impact.

In additional embodiments for providing the pre-coding information with less signaling overhead, additional compression mechanisms could be exploited. For example, contiguous resource allocation together with wideband pre-coding will lead to portions of the signal spectrum having identical pre-coding information, and advantage may be taken of this fact for compression purposes.

The need for maintaining backwards compatibility is met by the embodiments of the invention discussed so far. If a MU-MIMO system includes "Release 8.0 compliant" UEs, (which do not have the resources to physically implement the active suppression or mitigation of inter-user interference, and which do not have the means to detect and receive the new pre-coding information channel), these UEs will still interoperate with UEs that do incorporate the features of the embodiments of the present invention. The older UEs will not be able to take advantage of the inter-user interference cancellation provided by the embodiments, but otherwise, they will continue to operate as before.

However, if a future MU-MIMO receiver system were designed with no requirement that backwards UE compatibility be maintained, additional information compression may be provided using the proposed pre-coding indicator channel. Presently, the PMI information for the particular UE is signaled as part of the PDCCH channel DCI grant format '1D', which according to TS 36.212, always contains the UE's own PMI. This information is also provided in the new pre-coding indicator channel, so if a pointer of a 2 bit width can be used in each UE's downlink grant, and just pointing to the appropriate PMI in the pre-coding information channel, the redundancy of transmitting the UE's PMI in both channels may be eliminated. However, this would change the DCI format for the PDCCH channel, and Release 8.0 compliant UEs could not operate in this particular embodiment, as they would not find their PMI correctly. The standards would have to be revised to use this embodiment. The approach would not be backwards compatible with existing LTE UEs in this embodiment, which may be a disadvantage in some applications.

Additional savings on the downlink shared channel overhead may be accomplished in alternative method embodiments. For example, some UEs could be excluded from the target group. UEs having poor or lower SINR conditions with respect to the other UEs in the group they belong to could be excluded from the group. This approach allows saving on the channel coding overhead (a higher code data rate could be used, since the poor SINR UE will not be receiving it). In any event, UEs with poor SINR are not likely to be included in a MU-MIMO group, as their poor channel conditions would be negatively impacted still more by the inclusion of other UEs on shared resources. Another method embodiment would be to group UEs together that share a large portion of their allocated resources, as these UEs would benefit the most from active interference cancellation and exclude UEs that share too small a portion of their allocated resources, because there is not as much to gain from inter-user interference cancellation in that case.

The embodiments of the present invention are useful for MU-MIMO configurations as described above. The embodiments are also useful for the proposed collaborative MIMO (C-MIMO); where MU-MIMO signals are transmitted to UEs from multiple cells. A group or sub-group of UEs may be formed as a target group for C-MIMO and cancellation of spatial interferers again would be desirable, to enhance system performance. The embodiments of the present invention also apply to device to device (D2D) communications. For D2D operation (UEs communicating with UEs, for example) and reusing DL resources, simulations indicate that large gains in performance may be obtained if the D2D receiver can actively cancel inter-user interference from the DL transmission. The examples and embodiments considered and described above assume that the MU-MIMO operation is such that UEs that are spatially multiplexed together are each assigned with a rank-1 transmission (i.e., a single spatial stream) and are each signaled with the corresponding PMI value. In scenarios with low to moderate spatial correlation at the eNB transmit antenna array, it is also envisioned as an alternative embodiment that (together with frequency selective precoding) MU-MIMO UEs may be spatially multiplexed together with each UE having potentially different transmission ranks. In one exemplary embodiment, assuming there are four transmit antennas (note the term "antenna" includes both physically implemented and virtual antennas as is known in the art) or 4-Tx at the transmitter for the eNB, a first UE in a group of spatially multiplexed UEs may receive two spatial streams (i.e., it receives a rank-2 transmission) while the two remaining UEs may each be assigned with a single spatial stream (i.e., they each receive a rank-1 transmission).

Another possible alternative embodiment is one in which a UE receives three spatial streams (i.e., it receives rank-3 transmissions) while a remaining UE gets a single spatial stream (rank-1). In these alternative embodiments, each MU-MIMO UE needs to receive as many PMIs to be signaled for its own transmission as the number spatial streams 'r' it is receiving (or equivalently a single rank-'r' PMI may also fulfill the purpose). With respect to implementing the pre-coding indicator channel, this requirement translates into the need for several PMIs being potentially allocated to a single UE. Conceptually this approach does not change the related interference suppression by any means. In additional alternative embodiments of the present invention that are contemplated by the inventors and which fall within the scope of any appended claims, other possibilities/combinations of UEs and number of assigned spatial streams and PMIs are possible, provided that the total number of spatial streams departing the eNB transmit antenna array does not exceed the number of transmit antennas the latter is made of (or more generally the number of virtual antennas the eNB operates with).

Presently, the standards for LTE Rel-8 use the same codebook for PMI reporting purposes by the UEs and for the actual pre-coding operation at the eNB side. Hence, the PMIs for reporting and for the precoding operation itself refer to the same precoding vectors. In another alternative embodiment that is presently contemplated by the inventors and which falls within the scope of any appended claims, a more general framework is used. In this case, more sophisticated precoding (such as zero-forcing precoding) may be applied at the transmit function of the eNB. The resulting eNB precoding would not necessarily correspond to the identical codebook that the UEs use for PMI reporting. The precoding codebook at the eNB may in fact be much larger, with a finer precoding granularity. In this alternative embodiment, the precoding indicator channel would carry PMIs pointing to the codebook used by the eNB for actual transmission so the UEs can use it for inter-user interference suppression; while the UEs would keep reporting with another (smaller) PMI codebook. Both of the codebooks, the one used for UE reporting and the one used by the eNB for precoding, are known to both the UEs and eNB.

Presently, as expressed in the standards, LTE Rel-8 single-user MIMO and MU-MIMO operations rely on PMI indications and on common reference symbols ("CRS") for demodulation (the latter are not spatially precoded). In addition to the signaling described above and the examples explained, it is also envisioned that SU- & MU-MIMO communications in future telecommunications systems may rely on precoded dedicated reference symbols ("DRS"). As envisioned, the DRS carry the precoding information. The use of the DRS would then allow UEs to directly estimate the precoded (equivalent) transmission channel from received DRS. In an embodiment that incorporated the latter case, PMI indication to the UE is not needed anymore, as the UEs keep reporting PMI information, but in the embodiment the UEs estimate the actual precoding used from the DRS sets. The DRS sets need to be indicated over the precoding- (or more precisely DRS-) indicator channel. Thus the PMI information used in the embodiments described above is removed and now the pre-coding information translates to DRS set indication, as separate DRS sequences and DRS time-frequency locations correspond to each spatial stream to be demodulated.

In an alternative embodiment incorporating this approach, for the case of MU-MIMO UEs, each target UE may receive or be directed to its own set of DRS(s) that that particular UE should use in order to demodulate the spatial stream(s) intended to it. At the same time, in this alternative approach, the MU-MIMO UE would also benefit from knowing the DRS sets used for transmission directed to spatially multiplexed UEs sharing the same resources.

In this embodiment, the DRS information for the other UEs could also be used for spatial interference tracking and estimation purposes. Another side benefit of this method embodiment is that UEs get to know which DRS sets are in use on each specific PRBs (or sub-bands). The UEs can use this information in a variety of ways to improve system performance. For example, in case the DRS are TDM/FDM multiplexed (as in LTE Rel-8), this allows the UEs to map/demap their data resource elements (Res) such that they avoid potential collision with other spatially multiplexed UEs' DRS (i.e., with DRS of a potential spatial interferer(s)). This collision issue does not occur when DRS between spatially multiplexed UEs are multiplexed together, e.g., by means of code-division multiplexing.

In yet another alternative embodiment envisioned by the inventors as part of the present invention, one may generalize the previously described embodiment concept of a broadcast indicator channel to carry DRS set indices instead of the precoding matrix indices (PMIs), and hence allow for MU-MIMO operation in a wireless system relying on DRS for demodulation. In this alternative embodiment, indication of the interfering DRS sets may benefit the UEs that are capable of spatial interference cancellation.

Embodiments of the present invention, as described above, can facilitate the active suppression of spatially multiplexed interferers by providing the pre-coding information to the D2D receiver using the pre-coding information channel, and the receiver then using the pre-coding vectors to do interference cancellation, using for example, a LMMSE receiver.

As additional embodiments, various alternative features may be employed. For example, the pre-coding vector for each UE may be either of wideband or frequency selective in nature. Further, as another alternative embodiment, the pre-coding indicator channel may allow for signaling a multiplicity of PMIs per downlink resource.

The target group of UEs may be configured for MU-MIMO downlink transmission. The target group may be divided into identifiable sub-groups. The target group or sub-group of UEs may be configured for collaborative MIMO ("C-MIMO") downlink transmission, where multiple cells transmit the spatially multiplexed signals.

In some embodiments, the pre-coding indicator channel may occupy fixed resources in time, and/or in frequency, in the downlink sub-frame where the MU-MIMO, C-MIMO or D2D transmissions are to be scheduled. In alternative additional embodiments, the pre-coding indicator channel may be dynamically scheduled in time, and/or in frequency, in the downlink sub-frame where MU-MIMO, C-MIMO or D2D transmissions are to be scheduled.

In some embodiments, the pre-coding indicator channel may be transmitted over the defined PDSCH channel as specified for Release 8.0 or later LTE systems. However, the embodiments are not limited to this mode of transmission.

In some embodiments, the use of transmit diversity pre-coding, TxD, is contemplated of the pre-coding indicator channel. This will ensure maximum coverage of the target group of UEs monitoring the pre-coding indicator channel.

Several types of signaling and compression are described above as alternative embodiment methods of the present invention for providing the pre-coding information. The types of signaling and compression used can be selected dynamically in some embodiments, for example by using 1 or 2 bits as an indicator, depending on the choice that leads to the lowest signaling overhead. The one selected will depend on resource allocation among the MU-MIMO UEs, the usage of PMIs, the number of PRBs in use, the number of MU-MIMO UEs, and other factors.

The overhead impact of the use of the pre-coding indicator channel proposed herein has been determined for a couple of cases. In general, common control channels have to be coded with robust MCS. This is so that UEs on the periphery of a cell area can properly decode the signals. There is no acknowledge/no acknowledge signaling on these channels, so it is important that a low block error rate ("BLER") be maintained; for example, BLER<1%. However, when a UE is selected and configured as a MU-MIMO receiver, it has already been identified as being in a good channel condition, that is, the signal-to-interference-and-noise ratio (SINR) is high, typically at least 5 dB or more. For these UEs then, the broadcast information on the pre-coding indicator channel could be channel coded/dimensioned as a function of the MU-MIMO UE in the group that reports the worst conditions (as channel quality indicator, "CQI"). CQI is a required report the UE provides to the base station prior to MU-MIMO operations.

Assuming, as a worst case example, that for a 10 MHz system bandwidth, and the worst case of all resources in use (i.e., all 50 available PRBs, all 16 available PMIs, and 4 users allocated to each PRB), the amount of information that needs to be sent is:

50 {PRBs}×4 [bits per PMI]×4 [users]+24 bits for CRC check=824 bits.

If the target bit error rate is 1% for the particular MU-MIMO UE in the worst SINR condition at 5 dB SINR, simulations have shown that at most, 6 PRBs are required to achieve the target BLER with QPSK modulation, and hence convey the pre-coding information to the MU-MIMO UEs in the cell or in a specific UE group. This total overhead represents 12% of the signaling for a worst case scenario, assuming full band MU-MIMOs in operation with all PMIs. This overhead is not too high for a fully loaded system given the system performance gains that active inter-user interference cancellation within the MU-MIMO UE provides.

In a more practical example, assuming some compression of pre-coding information is done, a better result is obtained. For example, MU-MIMO UEs will not be allocated all their resources in frequency (PRBs), nor will the MU-MIMO UEs make use of all of the available PMIs simultaneously. Further, it is not expected that the maximum number of users will be allocated simultaneously for each PRB. Finally, the needed coding rate can be higher than assumed in the example above, depending on the MU-MIMO UE with the worst case channel quality condition (CQI). This will result in lower channel coding overhead.

Assume the following scenario with partial load and one example of how the pre-coding information can be compressed:

- 40% of bandwidth utilization for MU-MIMO out of a total system BW of 10 MHz (50 PRB): a 50-bit bitmap can be used as header to indicate the 20 PRBs in use.
- 50% of the PMIs simultaneously in use: a 16-bit bitmap can be used as header to indicate the 8 PMIs in use.
- 80% of the multi-user pairings are performed with 2 UEs and the other 20% with 3 to 4 UEs: a single bit is used to indicate whether the PMIs of 2 or up to 4 UEs need to be signaled for each PRB in use for MU-MIMO.

These assumptions lead to the following amount of information to be transmitted on the pre-coding indicator channel:

50 bits [PRB usage header]+16 bits [PMI usage header]+ 80/100×20 [used PRBs]×(1 bit [# of MU-MIMO UEs]+3 bits [8 PMIs in use]×2 [PMI indication for 2 UEs])+ 20/100×20 [used PRBs]×(1 bit [# of MU-MIMO UEs]+3 bits [8 PMIs in use]×4 [PMI indication for 4 UEs])+ 24 bit [CRC]
=254 bits The overhead now represents almost 70% less than in the previously considered worst case scenario. Assuming a 1% target BLER at 5 dB SINR will require around ⅔ channel coding rate and about 2 PRBs (out of a total of 50), which is relatively low overhead (4%). Thus, significant compression of the pre-coding information is achieved in a practical use case.

The UEs of the present embodiments may implement the active inter-user interference suppression in a variety of ways and the embodiment and any appended claims contemplate and cover these alternatives as part of the invention. For example, the LMMSE receiver is one way to compensate for inter-user interference. This function may be provided as hardware, as part of an integrated circuit or integrated circuits, or as software executed on a programmable processor that may provide part or all of the UE functions. A dedicated processor or co-processor could be used. The UE may have various types of storage for storing the pre-coding information, the codebook, and other parameters.

Although various embodiments of the present invention and its advantages have been described in detail, it should be understood that various changes, substitutions and alterations can be made herein without departing from the spirit and scope of the invention as defined by the appended claims. For example, many of the processes discussed above can be implemented in different methodologies and replaced by other processes, or a combination thereof, to advantageously coordinate allocation of resources for user equipment to be handed over from a source base station to a target base station without contention and without a need for sharing timing information therebetween, as described herein.

Moreover, the scope of the present application is not intended to be limited to the particular embodiments of the process, machine, manufacture, and composition of matter, or means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
at least one processor; and
memory including computer program code;
the computer program code configured to, with the at least one processor and the memory, cause the apparatus to perform at least the following:
determine information related to transmit pre-coding for a plurality of communication devices coupled to the apparatus using shared radio resources in over the air communications;
provide an assigned communication resource for transmission of the determined information related to transmit pre-coding to the plurality of communication devices;
format said information related to transmit pre-coding as data for transmission to said communication device employing said assigned communication resource; and
determine that the information related to transmit pre-coding may be provided as a subset of pre-coding matrix indices corresponding to entries found within a codebook resident within the plurality of communication devices or may be provided as indices of pre-coded dedicated reference symbol sets associated to different spatial streams.

2. The apparatus according to claim 1, wherein the memory including the computer program code is configured to, with the at least one processor, cause said apparatus to provide a physical downlink shared channel or a physical downlink control channel as the assigned communication resource.

3. The apparatus according to claim 1, wherein the memory including the computer program code is configured to, with the processor, cause the apparatus to perform data compression on the information related to transmit pre-coding.

4. The apparatus according to claim 1, wherein the memory including the computer program code is configured to, with the at least one processor, cause the apparatus to provide the information related to transmit pre-coding in the form of a table of physical resource blocks containing entries of pre-coding information for communications devices sharing the radio resource.

5. The apparatus according to claim 1, wherein the memory including the computer program code is further configured to, with the at least one processor, cause the apparatus to provide grouping information for the communications devices sharing the radio resource.

6. A computer program product comprising a program code stored in a computer readable medium which, when executed by an apparatus including a programmable processor and a memory, is configured to cause the apparatus to:
determine information related to transmit pre-coding for a plurality of communication devices coupled to the apparatus using shared radio resources in over the air communications;
provide an assigned communication resource for transmission of the information related to transmit pre-coding to the plurality of communication devices;
format the information related to transmit pre-coding as data for transmission to the plurality of communications devices employing the assigned communication resource; and determine that the information related to transmit pre-coding may be provided as a subset of pre-coding matrix indices corresponding to entries found within a codebook resident within the plurality of communication devices or may be provided as indices of pre-coded dedicated reference symbol sets associated to different spatial streams.

7. A method, comprising:

determining information related to transmit pre-coding for a plurality of communication devices using shared radio resources in over the air communications;

providing an assigned communication resource for transmission of the information related to transmit pre-coding as data to the plurality of communication devices;

formatting the information related to transmit pre-coding as data for transmission to the plurality of communication devices employing the assigned communication resource; and determining the information related to transmit pre-coding as a subset of pre-coding matrix indices corresponding to entries in a predetermined pre-coding information table or as indices of pre-coded dedicated reference symbol sets associated to different spatial streams.

8. The method according to claim 7, further comprising providing the assigned communication resource using a physical downlink shared channel or a physical downlink control channel.

9. The method according to claim 7, further comprising performing data compression on the information related to transmit pre-coding.

10. An apparatus comprising:
at least one processor; and
memory including computer program code;
the memory and the computer program code configured, with the at least one processor, to cause the apparatus to perform at least the following:
  receive a communication containing information related to transmit pre-coding over a pre-assigned communication resource, and
  decode data indicating the information related to transmit pre-coding for at least one other communications device using a shared radio resource for over the air communications wherein the information related to transmit pre-coding is determined as a subset of pre-coding matrix indices corresponding to entries in a predetermined pre-coding information table, or as indices of pre-coded dedicated reference symbol sets associated to different spatial streams.

11. The apparatus according to claim 10, wherein the memory including the computer program code is configured to, with the processor, cause the apparatus to decode the data and to use the decoded data to suppress interference from at least one other communications device using the shared radio resource.

12. The apparatus according to claim 10, wherein the memory including the computer program code is configured to, with the processor, cause the apparatus to receive communications using a multiple-input multiple-output receiver configured to receive radio communications using an over the air interface.

13. The apparatus according to claim 10, wherein the pre-assigned communication resource comprises a physical downlink control channel or a physical downlink shared channel.

14. The apparatus according to claim 10, wherein the information related to transmit decoding further includes grouping information for a plurality of communications devices using the shared radio resource.

15. A method, comprising:
receiving a communication containing information related to transmit pre-coding over a pre-assigned communications resource; and
decoding data from the communication indicating information related to transmit pre-coding for at least one other communications device using a shared radio resource, wherein the information related to transmit pre-coding is determined as a subset of pre-coding matrix indices corresponding to entries in a predetermined pre-coding information table, or as indices of pre-coded dedicated reference symbol sets associated to different spatial streams.

16. The method according to claim 15, further comprising:
using the decoded data from the communication indicating information related to transmit pre-coding to suppress interference from at least one other communications device using the shared radio resource.

17. The method according to claim 15, further comprising receiving the information related to transmit pre-coding using a pre-assigned communications resource that is a physical downlink control channel or a physical downlink shared channel.

18. The method according to claim 15, further comprising performing device-to-device communications using the shared radio resource over an air interface.

* * * * *